Patented Sept. 26, 1950

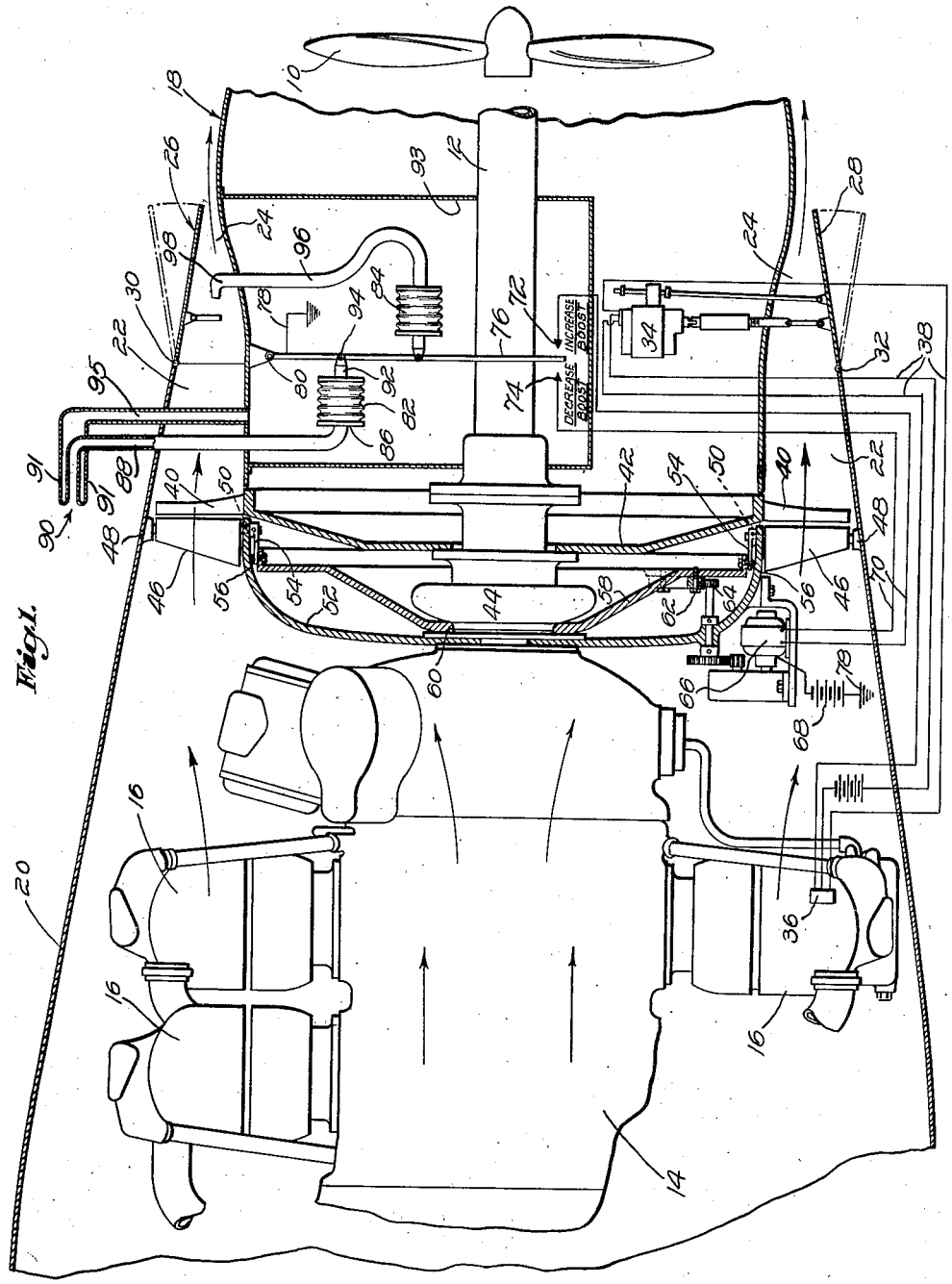

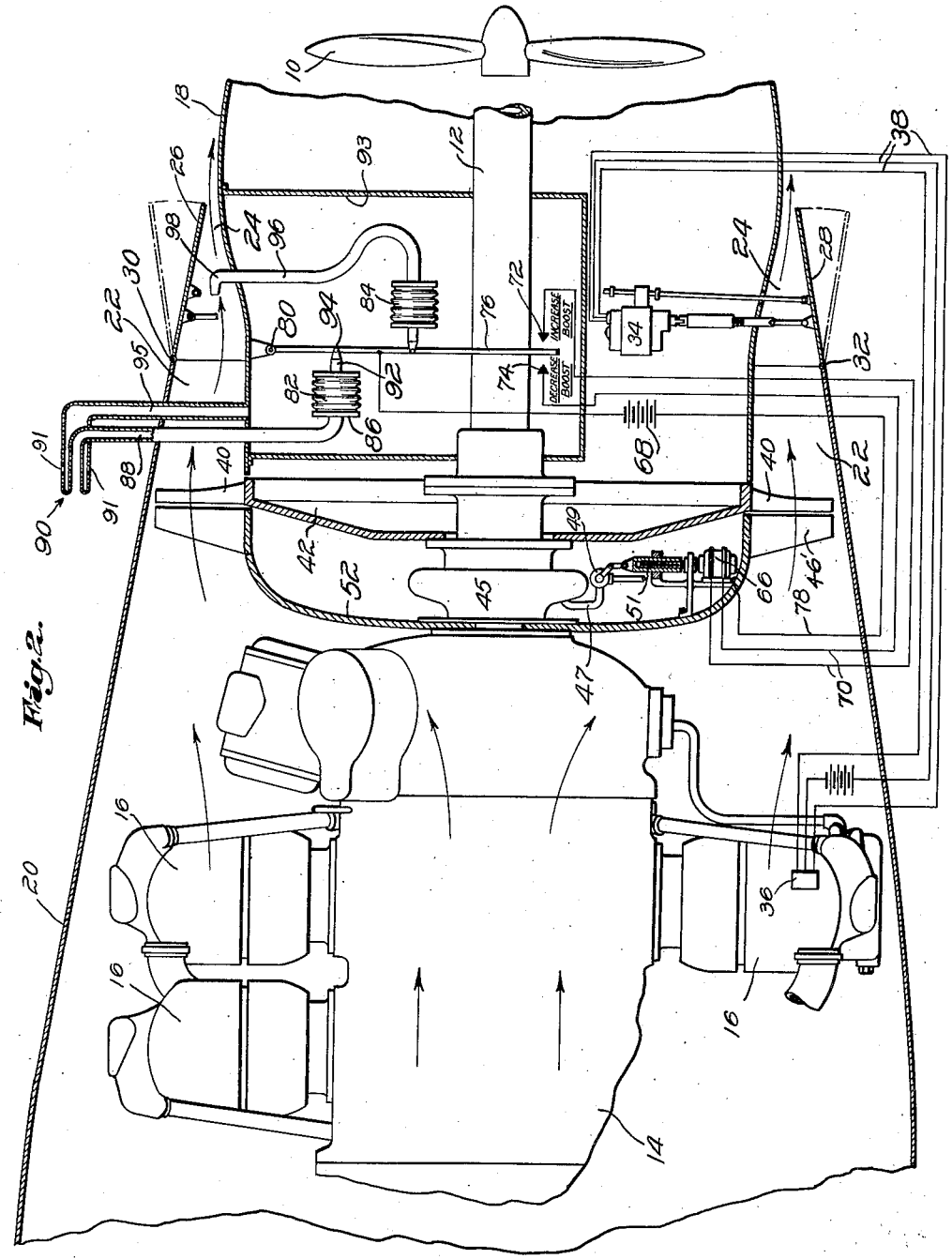

2,523,404

UNITED STATES PATENT OFFICE 2,523,404

COOLING AIR EXIT VELOCITY CONTROL

Rudolf N. Wallace, Glastonbury, Conn., assignor to United Aircraft Corporation, East Hartford, Conn., a corporation of Delaware Application April 12, 1945, Serial No. 588,024

6 Claims. (Cl. 123—171)

This invention relates to a method and an apparatus for controlling the discharge of a fluid stream from an aircraft into a surrounding free airstream.

An object of the invention is to provide improvements in control means for a fluid stream discharged from an aircraft.

Another object is to control the momentum of a fluid stream discharged from an aircraft relative to the free airstream.

A further object is to control both the discharge velocity and the mass rate of flow of a fluid stream discharged from an aircraft.

A further object is to control the exit velocity of aircraft engine cooling air in accordance with the velocity of the aircraft relative to the surrounding air and to control the mass rate of flow of the engine cooling air in accordance with engine cooling requirements.

A further object is to provide a novel control apparatus for an aircraft engine cooling air fan or blower.

Other objects and advantages will be apparent from the specification and claims, and from the accompanying drawing which illustrates what is now considered to be a preferred embodiment of the invention.

In the drawings,

Fig. 1 is a schematical view of a portion of a pusher type aircraft incorporating one embodiment of the invention.

Fig. 2 is a schematic view similar to Fig. 1 but showing a modification of the invention.

In Fig. 1 adjustable contravanes are used to control the output of the cooling air fan while in Fig. 2 the fan output is varied by controlling fan speed. In both these figures the aircraft propeller is shown of disproportionately small size in order to simplify the drawing.

Referring to the embodiment of Fig. 1, there is shown a portion of an aircraft having a pusher propeller 10 driven by an extension shaft 12 from a power plant 14, illustrated as a two row radial engine having air cooled cylinders 16. Surrounding the power plant and the extension shaft is a streamlined cowl having a rear section 18 and a forward section 20 telescoped in spaced relationship at their adjacent ends to provide an annular passage 22 for the engine cooling air. This cooling air is admitted to the cowl in a conventional manner through a cowl entrance opening (not shown) from which it passes through the forward cowl section 20 over the engine 14 and cylinders 16 and then through the annular passage 22, from whence it is discharged to the free airstream flowing over the outside of the cowl 18, 20 through the variable area annular exit opening 24. The exit area of opening 24 is controlled by a circumferential row of cowl flaps, two of which are shown at 26 and 28, pivotally connected to the cowl section 20 as at 30 and 32. These cowl flaps are interconnected for simultaneous movement by linkage (not shown) and are adjusted about their pivots as shown by the dotted lines with a reversible flap motor 34 electrically connected by leads 38 to a two-position switch or thermostat 36 attached to one of the cylinders 16. Switch 36 responds to cylinder temperatures and controls the flow of current to motor 34 in a known manner to open or close the cowl flaps as the cylinder temperature respectively increases or decreases. Other types of control units may be utilized for controlling the flap motor 34 in accordance with engine cooling requirements, for instance as described by my application Serial No. 561,293, filed October 31, 1944, or as described in Nissen Patent No. Re. 21,312.

Such an exit flap control for regulating the mass rate of flow of engine cooling air in accordance with engine cooling requirements is old in the art and does not per se constitute the present invention.

While such exit flaps will create an increase in cooling pressure drop or cooling airflow due to their "ejector effect" they do not provide, in some installations, an adequate mass rate of flow of cooling air under all operating conditions, even in conjunction with the dynamic pressure available. Furthermore, merely to "dump" the cooling air from the cowl openings into the surrounding free airstream, as is done in conventional installations utilizing flap control only, creates turbulence and other disturbances causing an increase in aircraft drag and results in inefficient utilization for aircraft propulsion purposes of the total energy available.

The addition of a fan to the engine cooling system will provide the additional pressure head necessary to supplement the cooling flow to provide a sufficiently large mass rate of flow to adequately cool the engine under practically all operating conditions. But if a fan is merely added to the system without correlating its operation relative to the control of the exit cowl flaps, the resulting system will still be inefficient and may require excessive amounts of power or will result in a waste of a considerable portion of total energy or power available.

According to this invention, a controllable means for adding energy to the cooling airstream, for instance a controllable cooling air fan or blower, is added to the conventional cowl flap cooling system, described above, and the operation of the fan is correlated with the operation of the cowl flaps to provide maximum propulsive efficiency for various operating conditions while maintaining the mass rate of flow of cooling air in accordance with engine cooling requirements.

For each installation and for each operating condition of a given installation including a fan and cowl flaps there will be some optimum combination of fan boost and cowl flap setting which will give the maximum propulsive efficiency, or minimum total horsepower required for cooling. Analysis of the cooling process, for an installation with a cooling fan downstream of the engine, indicates that an equation of the following or some similar form will define the condition for minimum cooling brake horsepower:

$$H_G = \frac{T}{T_H}\left(\frac{\eta B}{\eta P}\right)^2 q_0$$

where:

$H_G$ = total pressure (above free stream static pressure) of the cooling air aft of the fan and ahead of the exit gill, or discharge opening.
$T$ = absolute free air temperature.
$T_H$ = absolute temperature of the air after engine heat has been added.
$\eta B$ = blower efficiency.
$\eta P$ = propeller efficiency.
$q_0$ = free stream dynamic pressure.

For a given installation this equation reduces to $H_G = K q_0$. K, of course, is not a true constant since it would actually vary with variations in heat rejection and efficiencies for different operating conditions, but an approximate value may be obtained for a given installation to serve as a basis for automatic control of the fan operation.

The above form of equation relates specifically to the embodiment of the invention described herein, but it will be apparent to those skilled in the art that equations of the same or similar form can be calculated or determined experimentally to define the conditions required to obtain maximum propulsive efficiency for any system wherein the velocity of a fluid discharged from an aircraft is regulated by adding a controlled amount of energy to the fluid stream before it is discharged.

In the embodiment of Fig. 1, a predetermined relationship of $H_G$ to $q_0$ may be maintained, while at the same time regulating the quantity of cooling air flowing in accordance with engine cooling requirements, as follows.

An axial flow fan having airfoil type blades 40 mounted radially on a disk 42 is driven through a transmission 44 from the extension shaft 12, which is in turn driven by the power plant 14. Fan blades 40 bridge the passage 22 and when the fan is rotated it increases or boosts the flow of engine cooling air through the passage 22 and the exit passage or nozzle 24.

To control the output or delivery of the fan blades 40 independently of the speed thereof a series of adjustable contravanes 46 are circumferentially spaced around the passage 22 immediately forward of the rotatable blades 40. These contravanes are pivotally mounted in bearings 48, 50, respectively fixed to the forward cowl section 20 and to a fixed bulkhead 52 which closes off the forward portion of the rear cowl section 18, in front of the fan disk 42. Bearings 48 and 50 are so arranged that the contravanes 46 may be rotated thereon about radial axes. Each contravane 46 is provided with an arm 54 having a pin and slot connection 56 with an annular disk 58 rotatably mounted at 60 on the housing of transmission 44. Disk 58 carries on one side thereof an annular gear segment 62 meshing with a pinion 64 driven through a reduction gear by a reversible motor 66. Operation of motor 66 in one or the other direction angularly adjusts disk 58 on the bearing 60 and thus rotates contravanes 46 in one or the other direction about their radial axes to thereby control the delivery or output of fan blades 40 by varying the effective angle of attack thereof.

Motor 66 is energized from a source of current such as a battery 68 and is controlled through leads 70 by a two position switch having fixed contacts 72, 74 and a movable contact 76. When contacts 72 and 76 are closed, motor 66 and consequently contravanes 46 are adjusted in a direction increasing the output of fan blades 40, the circuit being completed through ground 78. When the contacts 74 and 76 are closed motor 66 and contravanes 46 are adjusted in the other direction, to decrease the fan output, the circuit being completed through ground 78. When the contact element 76 is in its neutral or open position the motor is not energized and consequently the contravanes will remain in their adjusted position.

Movable switch element 76 is pivotally mounted at 80 on the rear cowl section 18 and is moved about this pivot by the resultant force of the opposing fluid pressures in bellows 82 and bellows 84.

These two bellows are positioned within a gas tight chamber 93, maintained at free stream static pressure by openings 91 communicating with chamber 93 through tube 95.

Bellows 82, which has a fixed end 86, is connected by conduit 88 with a nozzle 90 positioned in the free airstream flowing over the cowl 18, 20. Nozzle 90 is positioned with the plane of its opening lying transversely to the direction of flow of the free airstream, or arranged in a manner well known to those skill in the art so as to provide a fluid pressure in bellows 82 which is a measure of the total pressure of the free stream air flowing over the cowl 18, 20. Thus the moving or free end 92 of bellows 82, which is pivotally attached at 94 to the switch arm 76, will exert a force on arm 76 which is proportional to or a function of the free stream dynamic pressure, or the difference between the free stream total pressure (in bellows 82) and the free stream static pressure (in chamber 93), in a direction tending to move arm 76 toward contact 72. In a similar manner bellows 84, which is connected by a conduit 96 to a nozzle 98 positioned in the variable area annual exit or discharge passage 24, will exert a force on arm 76 which is a function of the total pressure of the air (above the free stream static pressure in chamber 93) passing through the passage 24, in a direction tending to move the arm 76 toward contact 74.

With this arrangement switch 72, 74, 76 is responsive to both the free stream dynamic pressure and the total pressure, or head, of the cooling air in the exit passage or gill. Therefore the position of the contravanes 46 and consequently the output or the "boost" of fan blades 40 will be regulated in accordance with the relative value of these two variables.

The total head of the cooling air, as measured by nozzle 98 in exit passage 24, varies with changes in the output of fan blades 40 (other factors remaining constant) and it will be seen that the bellows 82, 84 will act when arranged as shown to regulate the boost of the cooling air blower to maintain a predetermined relationship between the total head of the cooling air in the cooling air exit passage and free stream dynamic pressure, or $H_G$ and $q_0$. The value of one of these factors relative to the other may be varied by changing the moment arms of the bellows 82, 84, or by varying their spacing relative to each other and to the pivot point 80. Constant K may be thus selected and the total head of the cooling air may be regulated through the control of the fan boost to provide for any given installation the condition where $H_G$ equals $Kq_0$, or approximately this relationship for most operating conditions.

This control of the total head of the discharge cooling air by varying the output or boost of fan blades 40 does not directly affect the flap control, which is responsive (in the embodiment of the drawing) only to engine cylinder temperatures. The flap control will vary the area of the exit opening 24 solely in accordance with cylinder temperature and therefore the mass rate of flow of cooling air through the cowl flaps will be varied solely in accordance with engine cooling requirements. Yet the velocity (and momentum) of the cooling air where it discharges into the free air through the cowl flaps will be controlled by the fan output regulating means in accordance with the velocity of the free airstream relative to the aircraft, irrespective of variations in engine cooling requirements.

Of course an operation of the flap motor 34 in response to a call by the engine for more or less cooling airflow would also probably result in a change in the fluid pressure in passage 24 and bellows 84, but this change would effect an adjustment of the contravanes 46 so as to re-establish the designed predetermined relationship between the pressure conditions at the sensing points 90 and 98. In a similar manner, a change in aircraft speed, or free stream velocity, or a change in cooling air pressure at the exit gill sufficient to cause an adjustment of contravanes 46 might also result in a change in the mass rate of cooling airflow. But any resulting change in cylinder temperature would effect an operation of the flap motor 34 and thereby re-establish the mass rate of cooling airflow at its correct value.

According to the embodiment of Fig. 1 the basic cooling control is obtained through manipulation of the cowl flaps by the thermal element 36 and the fan is independently regulated to maintain that relationship between the pressure conditions of the cooling air and the free stream air which gives maximum propulsive efficiency, or minimum cooling power loss. The lever arms of the bellows 82 and 84 may be adjusted by moving their point of attachment to the switch element 76 relative to the pivot 80 to give optimum results in utilization of the total power available for aircraft propulsion, as determined either by calculation or experiment. Fine adjustments may be made through opening or closing the cowl flaps and the fan control may be adjusted for a relatively wide differential or step control.

The output of the fan may be regulated in other ways than by varying contravane position. For instance, by varying the fan blade pitch, the fan speed, or a combination thereof. As shown in the embodiment of Fig. 2, the fan 40, 42, which may have fixed contravanes 46' in front thereof, is driven by a hydraulic transmission 45, the speed ratio of which is controlled by varying the amount of a working fluid, such as oil, supplied thereto through a conduit 47, in a manner known to those skilled in the art (for instance as disclosed in the Hobbs-Willgoos Patent No. 2,400,307 of May 14, 1946, assigned to applicant's assignee). The flow of working fluid through conduit 47 is regulated by a valve 49 connected through a screw mechanism 51 with the motor 66. These parts are so arranged that the motor 66 is controlled by the operation of the switch 72, 74, 76, as previously described, so as to adjust valve 49 to vary the supply of oil to transmission 45 and thereby vary the ratio of the transmission and the speed of the fan blades 40, thus controlling the output of the fan to provide the necessary pressure conditions at the nozzle 98. In other respects the embodiment of Fig. 2 operates exactly as does that of Fig. 1.

In both embodiments of the invention, illustrated in Figs. 1 and 2, the datum pressure in chamber 93 is free stream static pressure, while free stream total pressure is applied to bellows 82 and discharge stream total pressure is applied to bellows 84. But these total pressures have as components the static and dynamic pressures of the respective fluid streams and therefore, as will be apparent to those skilled in the art, the invention may also be practiced by utilizing the dynamic or static pressures of the free and discharged fluid streams, or some combination thereof, as a controlling means for regulating the exit velocity of the discharged fluid in predetermined relation to the velocity of the aircraft.

It is to be understood that the invention is not limited to the specific embodiments herein illustrated and described, but may be used in other ways without departure from its spirit as defined by the following claims.

I claim:

1. In combination, an engine having a power output shaft, a propeller driven by said shaft, a cooling air blower driven by said shaft, a cowl surrounding said engine and said blower, a discharge cooling air passage extending from said blower to the exterior of said cowl, adjustable cowl flaps for varying the discharge area of said discharge passage, means including a thermostat responsive to engine temperature for adjusting said cowl flaps, adjustable means for varying the output of said blower, and a control mechanism for controlling said adjustable means comprising, a chamber subjected to the static pressure of the free airstream outside of said cowl, a first bellows in said chamber subjected to the total pressure of said free airstream, a second bellows within said chamber subjected to the total pressure of the cooling air in said discharge passage, and a switch actuated by said first and second bellows.

2. In an engine cooling system including a cowl around the engine over which free air flows, said cowl having means for varying the air discharge area thereof, a cooling fan in said cowl, a hydraulic transmission connecting said fan to the engine, means responsive to the temperature of said engine for adjusting said discharge area varying means and means responsive to the relative velocity of the free air stream and the air discharged from said cowl for regulating the amount of working fluid fed to said transmission for controlling the output of said fan.

3. In combination, an engine having a power output shaft, a propeller driven by said shaft, a cooling air blower driven by said shaft, a cowl surrounding said engine and said blower, a discharge cooling air passage extending from said blower to the exterior of said cowl, adjustable cowl flaps for varying the discharge area of said discharge passage, means including a thermostat responsive to engine temperature for adjusting said cowl flaps, adjustable means including contravances for varying the output of said blower, and a control mechanism for controlling said adjustable means comprising, a chamber subjected to the static pressure of the free air stream outside of said cowl, a first bellows in said chamber subjected to the total pressure of said free air stream, a second bellows within said chamber subjected to the total pressure of the cooling air in said discharge passage, and a switch actuated by said first and second bellows.

4. In combination, an engine having a power output shaft, a propeller driven by said shaft, a cooling air blower driven by said shaft, a cowl surrounding said engine and said blower, a discharge cooling air passage extending from said blower to the exterior of said cowl, adjustable cowl flaps for varying the discharge area of said discharge passage, means including a thermostat responsive to engine temperature for adjusting said cowl flaps, adjustable means including a hydraulic transmission for varying the output of said blower, and a control mechanism for controlling said adjustable means comprising, a chamber subjected to the static pressure of the free air stream outside of said cowl, a first bellows in said chamber subjected to the total pressure of said free air stream, a second bellows within said chamber subjected to the total pressure of the cooling air in said discharge passage, and a switch actuated by said first and second bellows.

5. In an engine cooling system including a cowl around the engine over which free air flows, said cowl having means for varying the air discharge area thereof, a cooling fan in said cowl, means for varying the angle of attack of the air in the inlet to said fan, means responsive to the temperature of said engine for adjusting said discharge area varying means, and means responsive to velocity of the free air stream and the velocity of the air discharged from said cowl for regulating the angle of attack to control the output of said fan.

6. In an engine cooling system including a cowl around the engine over which free air flows, said cowl having means for varying the air discharge area thereof, a cooling fan in said cowl, a variable speed transmission connecting said fan to the engine, means responsive to the temperature of said engine for adjusting said discharge area varying means, and means responsive to the velocity of the free air stream and the velocity of the air discharged from said cowl for varying the speed of said fan through said variable speed transmission.

RUDOLF N. WALLACE.

REFERENCES CITED

The following references are of record in the file of this patent:

UNITED STATES PATENTS

| Number | Name | Date |
|---|---|---|
| 1,043,344 | Newman | Nov. 5, 1912 |
| 1,170,730 | Benjamin et al. | Feb. 8, 1916 |
| 1,712,622 | Kruckenberg et al. | May 14, 1929 |
| 1,989,413 | Hagen (A) | Jan. 29, 1935 |
| 2,081,762 | Nissen | May 25, 1937 |
| 2,160,281 | Price | May 30, 1939 |
| 2,384,088 | Hagen | Sept. 4, 1945 |
| 2,403,797 | Hersey | July 9, 1946 |

Certificate of Correction

September 26, 1950

Patent No. 2,523,404

RUDOLF N. WALLACE

It is hereby certified that error appears in the printed specification of the above numbered patent requiring correction as follows:

Column 7, lines 8 and 9, for "contravances" read *contravenes*;

and that the said Letters Patent should be read as corrected above, so that the same may conform to the record of the case in the Patent Office.

Signed and sealed this 28th day of November, A. D. 1950.

[SEAL].

THOMAS F. MURPHY,
*Assistant Commissioner of Patents.*